(12) United States Patent
Kishimoto

(10) Patent No.: US 10,985,684 B2
(45) Date of Patent: Apr. 20, 2021

(54) MOTOR CONTROL DEVICE

(71) Applicant: Panasonic Intellectual Property Management Co., Ltd., Osaka (JP)

(72) Inventor: Kenichi Kishimoto, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 39 days.

(21) Appl. No.: 16/079,867

(22) PCT Filed: Feb. 14, 2017

(86) PCT No.: PCT/JP2017/005209
§ 371 (c)(1),
(2) Date: Aug. 24, 2018

(87) PCT Pub. No.: WO2017/154476
PCT Pub. Date: Sep. 14, 2017

(65) Prior Publication Data
US 2019/0260322 A1    Aug. 22, 2019

(30) Foreign Application Priority Data

Mar. 8, 2016   (JP) .............................. JP2016-044164

(51) Int. Cl.
*H02P 23/14*   (2006.01)
*H02P 23/06*   (2016.01)
(Continued)

(52) U.S. Cl.
CPC ............ *H02P 23/14* (2013.01); *G05B 19/416* (2013.01); *H02P 6/08* (2013.01); *H02P 23/06* (2013.01);
(Continued)

(58) Field of Classification Search
CPC .......... H02P 23/14; H02P 23/06; H02P 23/10; H02P 2205/05; H02P 23/12; G05B 2219/33086; G05B 19/416
See application file for complete search history.

(56) References Cited

U.S. PATENT DOCUMENTS 5,886,491 A * 3/1999 Yoshida ............... G05B 13/024
318/592
2009/0302796 A1* 12/2009 Minamide ............ G05B 19/404
318/630

(Continued)

FOREIGN PATENT DOCUMENTS

JP    9-074783      3/1997
JP    09074783 A *  3/1997

(Continued)

OTHER PUBLICATIONS

International Search Report of PCT application No. PCT/JP2017/005209 dated Apr. 25, 2017.

*Primary Examiner* — Kawing Chan
*Assistant Examiner* — Bradley R Brown
(74) *Attorney, Agent, or Firm* — McDermott Will and Emery LLP

(57) ABSTRACT

A motor control device includes a control and computation unit, a compensation signal generation unit, an adder, and a drive unit. The control and computation unit is configured to perform computation processing based on a detected rotational position of a motor and a positional instruction, and to generate a first torque instruction signal to be used to drive the motor. The compensation signal generation unit is configured to generate a torque compensation signal to be used to compensate the first torque instruction signal. The adder is configured to add the torque compensation signal to the first torque instruction signal, and to output an acquired signal as a second torque instruction signal. The drive unit (Continued)

is configured to generate a drive signal to be used to power-drive winding wires of the motor based on the second torque instruction signal. The compensation signal generation unit is further configured to generate a torque compensation signal that switches to a torque compensation value having a predetermined value at a switching timing based on a timing when a rotation direction of the motor inverts.

15 Claims, 14 Drawing Sheets

(51) Int. Cl.

| | | |
|---|---|---|
| *H02P 23/10* | (2006.01) | |
| *H02P 23/12* | (2006.01) | |
| *G05B 19/416* | (2006.01) | |
| *H02P 29/00* | (2016.01) | |
| *H02P 6/08* | (2016.01) | |

(52) U.S. Cl.
CPC .............. *H02P 23/10* (2013.01); *H02P 23/12* (2013.01); *H02P 29/00* (2013.01); *G05B 2219/33086* (2013.01); *H02P 2205/05* (2013.01)

(56) References Cited

U.S. PATENT DOCUMENTS

2010/0259207 A1* 10/2010 Kitanaka ................. H02P 21/22
318/400.17
2015/0323924 A1  11/2015 Nagaoka et al.

FOREIGN PATENT DOCUMENTS

| | | |
|---|---|---|
| JP | 11-143548 | 5/1999 |
| JP | 2001-022417 | 1/2001 |
| JP | 2009-301081 | 12/2009 |
| WO | 2014/122822 | 8/2014 |

* cited by examiner

MOTOR CONTROL DEVICE

CROSS-REFERENCE TO RELATED APPLICATIONS

This application is a U.S. national stage application of the PCT International Application No. PCT/JP2017/005209 filed on Feb. 14, 2017, which claims the benefit of foreign priority of Japanese patent application No. 2016-044164 filed on Mar. 8, 2016, the contents all of which are incorporated herein by reference.

TECHNICAL FIELD

The present invention relates to a motor control device configured to mainly control an industry-use, factory automation (FA) servo motor.

BACKGROUND ART

Industry-use, FA servo motors are often utilized in processing machines having a plurality of axes. To allow such a processing machine to follow a positional instruction sent from a higher controller so that servo motors linked to each other in two axes or three axes operate together at improved processing accuracy, for example, accuracy in trajectory in a linked operation is important.

FIG. 14 is a view illustrating an example of a result of measurement on magnitude of trajectory deviation on two axes, i.e., axis X and axis Y, and showing trajectory accuracy when a conventional motor control device caused the two axes to each render a circular trajectory. As illustrated in the view, the trajectory locally and significantly deviated from a circle at positions where each quadrant switches. Such a phenomenon is generally referred to as quadrant projection. Major possible causes of quadrant projection are as follows. A rotation direction of a servo motor first inverts at a position at which a quadrant switches. A direction of machine friction to occur inverts accordingly. Due to this inversion, a polarity of load torque on the servo motor inverts. A delay in response occurs accordingly in the servo motor. That is, it is conceivable that a deviation between a positional instruction sent from a higher controller and a rotational position of the servo motor increases at a position at which a quadrant switches due to the delay in response.

FIG. 15 is a block diagram illustrating a configuration of a motor control system including conventional motor control device 90. In FIG. 15, motor control device 90 power-drives motor 60. Motor 60 is attached with encoder 69. Encoder 69 is configured to output signal Pd indicative of a rotational position of motor 60. Motor 60 and encoder 69 are structurally integrated to configure a servo motor.

In motor control device 90, control and computation unit 12 accepts positional instruction signal Pr sent externally and signal Pd that is indicative of a rotational position and that is sent from encoder 69. In control and computation unit 12, control and computation processing takes place. Control and computation unit 12 then outputs signal Tq1 corresponding to a torque instruction. Inversion detection unit 332 detects that a polarity of a speed instruction signal representing signal Pr/dt acquired by differentiating positional instruction signal Pr has inverted, and outputs inversion detection signal Rv indicative of the polarity of the speed instruction signal. Switch 51 follows inversion detection signal Rv to perform switching between torque compensation value Val9 and value Val9 acquired by inverting a polarity of torque compensation value Val9 with positive/negative inversion unit 91, and outputs a switched value as torque compensation signal Cmp9. Adder 14 adds torque compensation signal Cmp9 and torque instruction signal Tq1 output from control and computation unit 12, and outputs a newly acquired signal as torque instruction signal Tq92. Drive unit 15 follows torque instruction signal Tq92 output from adder 14 to drive motor 60.

Operation when axis X and axis Y are driven by using two pairs of a conventional servo motor and motor control device 90 configured as described above, and when positional instruction signal Pr is provided so that circular trajectories are rendered will now be described.

FIG. 16 is a waveform chart illustrating signal waveforms of units of conventional motor control device 90, i.e., signal waveforms of the units of motor control device 90 on one of the axes. In FIG. 16, the waveform chart is separated into (a) to (d), and waveforms of signal Pr/dt, friction torque, inversion detection signal Rv, and torque compensation signal Cmp9 are illustrated in a descending order. In FIG. 16, signal Pr/dt represents a signal acquired by differentiating positional instruction signal Pr entered into motor control device 90, and corresponds to a speed instruction. As a polarity inverts at points of time t0, t2, t4, and t6, a rotation direction of motor 60 inverts. Accordingly, as illustrated in FIG. 16, a polarity of friction torque in the machine then significantly inverts.

Inversion detection signal Rv output from inversion detection unit 332 represents, as illustrated in FIG. 16, a signal that inverts at points of time t0, t2, t4, and t6. Torque compensation signal Cmp9 output from switch 51 accordingly changes, as illustrated in FIG. 16.

With the motor control device having a conventional configuration, as described above, torque compensation signal Cmp9 acts so as to compensate a significant change in friction torque at timings at which a quadrant switches, as illustrated in FIG. 16. As a result, the above described action suppresses quadrant projection in magnitude (e.g., see PTL 1).

CITATION LIST

Patent Literature

PTL 1: WO 2014/122822 A

SUMMARY OF THE INVENTION

A motor control device according to the present invention is a motor control device configured to control a rotation operation of a motor so that a rotational position of the motor follows a positional instruction entered externally. The motor control device includes a control and computation unit, a compensation signal generation unit, an adder, and a drive unit. The control and computation unit is configured to perform computation processing based on a detected rotational position of the motor and a positional instruction, and to generate a first torque instruction signal to be used to drive the motor. The compensation signal generation unit is configured to generate a torque compensation signal to be used to compensate the first torque instruction signal. The adder is configured to add the torque compensation signal to the first torque instruction signal, and to output a result of the addition as a second torque instruction signal. The drive unit is configured to be supplied with the second torque instruction signal, and, based on the second torque instruction signal, to generate a drive signal to be used to power-drive winding wires of the motor. The compensation signal generation unit is further configured to generate a torque compensation signal that switches to a torque compensation value having a predetermined value at a switching timing based on a timing when a rotation direction of the motor inverts.

With the configuration including the compensation signal generation unit configured to generate a torque compensation signal that switches to a torque compensation value having a predetermined value immediately after a torque compensation value has switched, as described above, the torque compensation signal can further closely follow a change in friction torque. The motor control device capable of further suppressing quadrant projection can be achieved.

In the motor control device according to the present invention, the compensation signal generation unit may include a compensation value generation unit, a switching timing generation unit, a signal switching unit, and a compensation signal direct current cut-off unit. The compensation value generation unit is configured to generate a first torque compensation value corresponding to one rotation direction and a second torque compensation value corresponding to another rotation direction opposite to the one rotation direction. The switching timing generation unit is configured to generate a switching timing. The signal switching unit is configured to perform switching between the first torque compensation value and the second torque compensation value based on the switching timing, to perform value combining, and to generate and output a combined torque compensation signal. The compensation signal direct current cut-off unit is configured to cut off a direct current component to be outputted as the torque compensation signal, the direct current component being included in the combined torque compensation signal.

As described above, with the configuration to separately generate a first torque compensation value and a second torque compensation value, both of the torque compensation values separately act at different amplitude. A torque compensation signal can further appropriately compensate friction torque. As a result, quadrant projection can be further suppressed.

In the motor control device according to the present invention, the compensation signal direct current cut-off unit may include a high-pass filter capable of resetting an internally accumulated direct current component. The high-pass filter is configured to be reset based on a switching timing, and to output a torque compensation signal from which a direct current component included in a combined torque compensation signal is cut off.

With this configuration, a direct current component can be cut off from a combined torque compensation signal, as well as, at a switching timing, switching to a torque compensation value having a predetermined value takes place, further accurately suppressing quadrant projection.

The motor control device according to the present invention may further include an observer unit configured to detect load torque applied to the motor from a second torque instruction signal supplied to the drive unit and a rotational speed of the motor, and to output a load torque estimation signal corresponding to the load torque. The motor control device may be configured such that the above described adder adds the load torque estimation signal to a first torque instruction signal, in addition to a torque compensation signal, and outputs an acquired signal.

With this configuration, a torque compensation value can be reduced. As a result, even when friction torque varies, its negative effects would not be less likely to act. The motor control device capable of stably suppressing quadrant projection further, with its superior practical performance, can therefore be achieved.

The motor control device according to the present invention may be configured to further include a compensation value calculation unit configured to calculate and set a value for a torque compensation value based on a load torque estimation signal when a rotation direction of the motor inverts.

With this configuration, a torque compensation value can be appropriately and automatically set. As a result, even when friction torque varies, its negative effects would be less likely to act. The motor control device capable of stably suppressing quadrant projection further, with its superior practical performance, can therefore be achieved.

The motor control device according to the present invention may be configured such that the compensation value calculation unit compensates a torque compensation value by a predetermined offset value, and sets a result of the compensation as the value for the torque compensation value.

With this configuration, a torque compensation signal can be generated without being affected by negative effects when a motor being loaded in a vertical axis is further loaded with torque due to gravity. A servo motor control device capable of stably suppressing quadrant projection even when a motor is applied to a vertical axis can be achieved.

The motor control device according to the present invention may further be configured such that the compensation value calculation unit stores, as an offset value, as described above, a load torque estimation signal when the motor stops, compensates the torque compensation value by the offset value, and sets an acquired value.

With this configuration, compensation using an offset value can be easily implemented, achieving a servo motor control device capable of stably suppressing quadrant projection with its superior practical performance even when a motor is applied to a vertical axis.

As described above, the motor control device according to the present invention can allow a torque compensation signal to fully follow a change in friction torque, appropriately compensating a change in load torque when a rotation direction inverts. Quadrant projection can thus be suppressed even when motors in a plurality of axes are linked and operated together.

DESCRIPTION OF EMBODIMENTS

With configurations, described later, motor control devices according to some exemplary embodiments of the present invention can further suppress quadrant projection.

In other words, the conventional configurations, as described above, need to be improved in terms of the following points. That is, in the conventional configurations, as described above, compensation using a torque compensation signal does not fully follow a change in friction torque due to some reasons, such as a rotational position of a motor does not promptly respond to a positional instruction signal, and a change in friction torque varies. The conventional configurations, as described above, do not thus fully achieve torque compensation, resulting in difficulty in suppressing quadrant projection.

In the exemplary embodiments, a torque compensation signal that switches to a proper value immediately after switching of a torque compensation value takes place is utilized, appropriately compensating a change in load torque when a rotation direction inverts. With the exemplary embodiments, quadrant projection can be suppressed even when motors in a plurality of axes are linked and operated together.

The exemplary embodiments of the present invention will now be described herein with reference to the accompanying drawings. Note, however, that the exemplary embodiments do not intend to limit the present invention.

First Exemplary Embodiment

Figure 1:
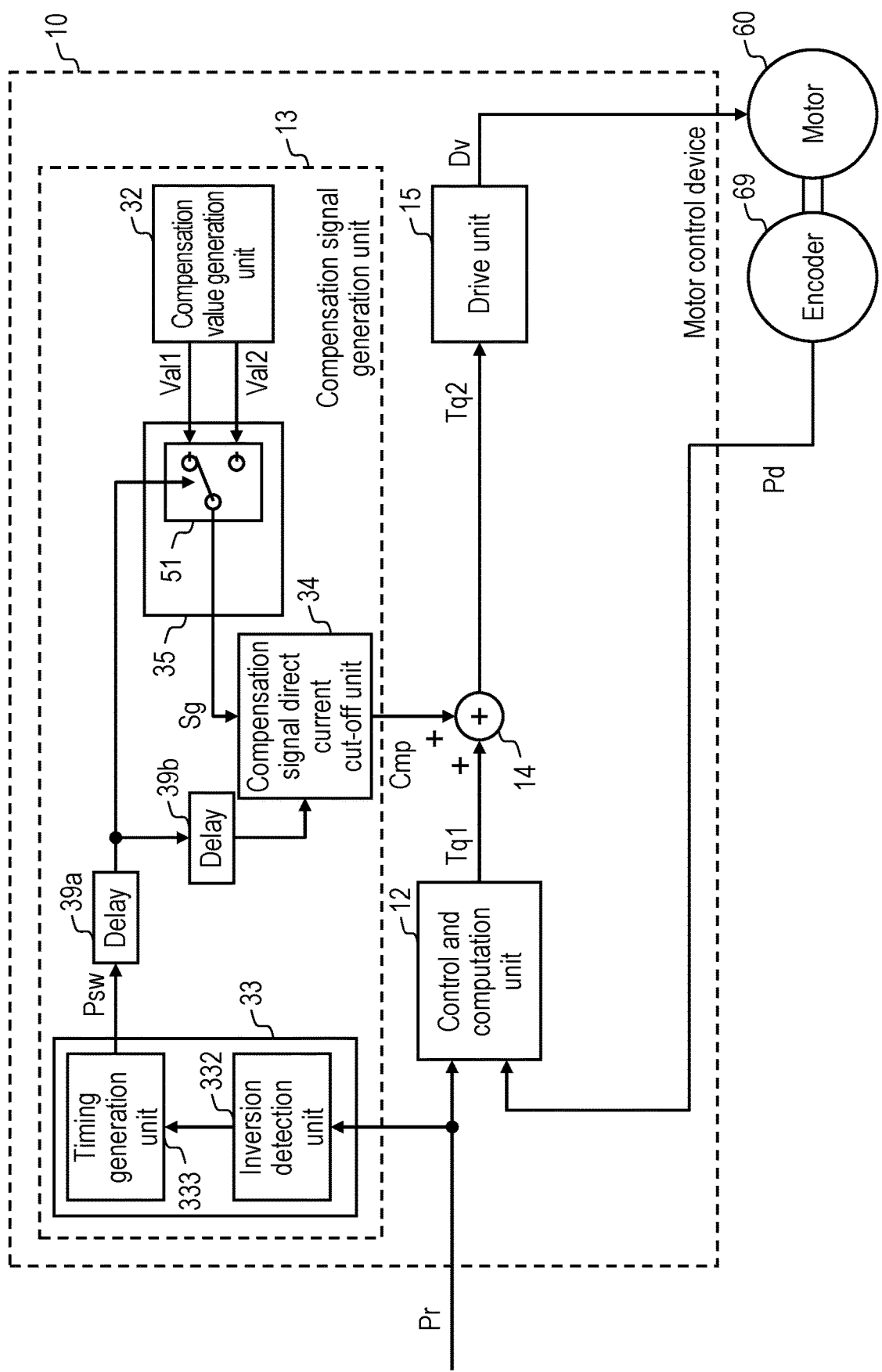
FIG. 1 is a block diagram of a motor control system including a motor control device according to a first exemplary embodiment of the present invention.

FIG. 1 is a block diagram of a motor control system including motor control device 10 according to a first exemplary embodiment of the present invention.

As illustrated in FIG. 1, the motor control system includes motor 60 configured to drive a coupled load, motor control device 10 configured to control and power-drive motor 60, and encoder 69 configured to detect a position of a moving part in motor 60. The motor control system is an example system configured to control and drive motor 60, such as a servo motor, primarily with motor control device 10, such as an industry-use servo amplifier. In the exemplary embodiment, an example motor including a rotor that rotates, as the moving part of motor 60, will be described. The motor including the rotor to be described below is merely an example. The present invention can also be applied to a linear motor including a moving part that performs a linear motion.

As motor 60 described above, such a brushless motor is advantageous that includes a stator with winding wires in three phases, i.e., a U phase, a V phase, and a W phase, and a rotor that faces the stator, and that is rotatably disposed around a rotation axis. In motor 60, the rotor rotates as the winding wires in the stator are power-driven by motor control device 10. As the rotor rotates, the load is driven and rotated via the rotation axis.

For allowing motor 60 to rotate, motor 60 is attached with encoder 69 as a position sensor configured to detect a rotational position of the rotor. With this configuration, encoder 69 outputs position detection signal Pd indicative of a detected rotational position. Position detection signal Pd is supplied from encoder 69 to motor control device 10.

Motor control device 10 is further coupled with a higher controller (not shown), for example. Various instructions including operation instructions are supplied to motor control device 10 so that motor 60 operates as desired. The exemplary embodiment describes an example when positional instruction signal Pr representing a positional instruction used to control a position of the rotor of motor 60 is supplied to motor control device 10.

Motor control device 10 coupled with the components described above has functions of detecting and estimating a motion, a position, and a speed of the motor to perform feedback control so that the motor follows an operation instruction. That is, motor control device 10 performs feedback control based on position detection signal Pd sent from encoder 69 to control a rotation operation so that a rotational position of motor 60 follows positional instruction signal Pr entered externally, and thus the rotor of motor 60 operates as desired.

Next, a configuration of motor control device 10 described above will now be described in detail with reference to FIG. 1. As illustrated in FIG. 1, motor control device 10 includes control and computation unit 12, compensation signal generation unit 13, adder 14, and drive unit 15.

Control and computation unit 12 is first supplied with position detection signal Pd indicative of a rotational position of motor 60, which is detected by encoder 69, and positional instruction signal Pr representing an externally supplied positional instruction. Control and computation unit 12 performs computation processing based on position detection signal Pd being supplied and positional instruction signal Pr being supplied to generate first torque instruction signal Tq1 used to drive motor 60.

Figure 2:
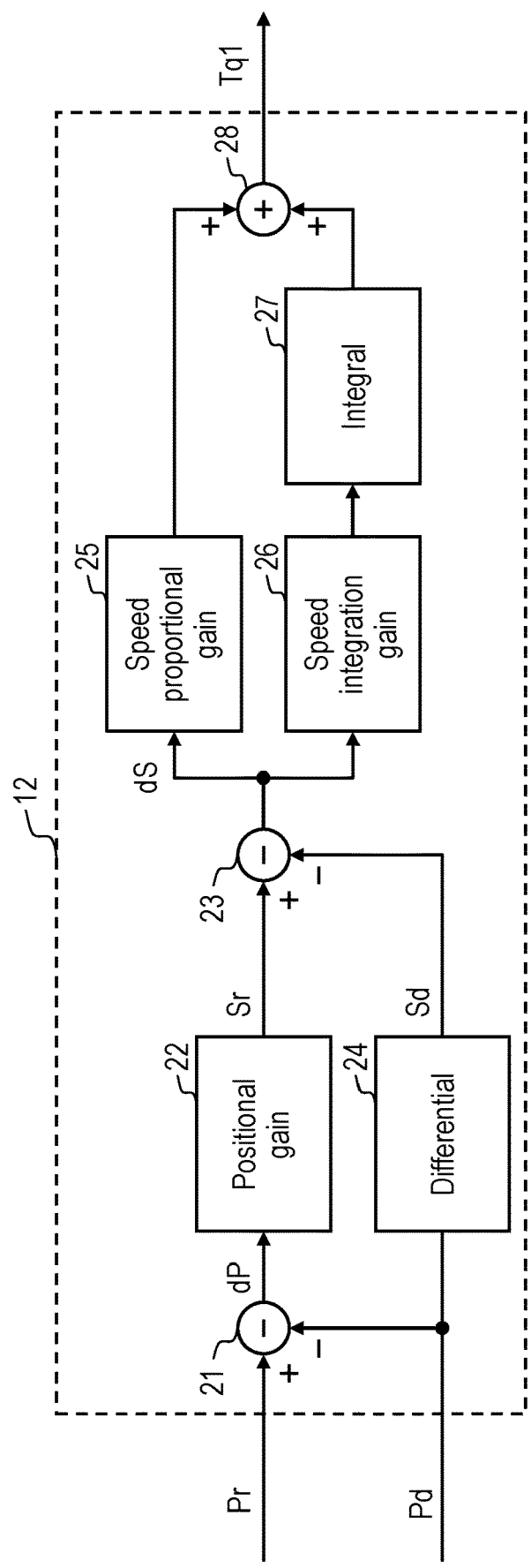
FIG. 2 is a block diagram illustrating details of a configuration example of a control and computation unit of the motor control device according to the first exemplary embodiment of the present invention.

FIG. 2 is a block diagram illustrating details of a configuration example of control and computation unit 12 of motor control device 10 according to the exemplary embodiment. FIG. 2 illustrates an ordinary configuration example of control and computation processing on a servo motor. Its specific configuration is as described below. In the configuration illustrated in FIG. 2, subtractor 21 first calculates a difference, i.e., positional deviation dP, between positional instruction signal Pr supplied externally and position detection signal Pd. Positional deviation dP is multiplied by positional gain setting unit 22 to acquire a positional gain. The positional gain is output as speed instruction signal Sr. On the other hand, with position detection signal Pd, differential computation unit 24 performs differential computing to calculate a rotational speed of motor 60. Rotational speed signal Sd indicative of the rotational speed is then output. Next, subtractor 23 calculates a difference, i.e., speed deviation dS, between speed instruction signal Sr and rotational speed signal Sd. Speed deviation dS is multiplied by speed proportional gain setting unit 25 to acquire a speed proportional gain. Speed integration gain setting unit 26 performs multiplication on speed deviation dS to acquire a speed integration gain. Integral computation unit 27 performs integral computing on the acquired speed integration gain. An output of speed proportional gain setting unit 25 and an output of integral computation unit 27 are added by adder 28. An acquired output is output as first torque instruction signal Tq1.

Next, in FIG. 1, compensation signal generation unit 13 generates and outputs torque compensation signal Cmp used to compensate first torque instruction signal Tq1. In the exemplary embodiment, torque compensation signal Cmp generated by compensation signal generation unit 13 is utilized to compensate a significant change in friction torque when a rotation direction of motor 60 inverts to prevent greater quadrant projection from occurring. Compensation signal generation unit 13 will be further described in detail.

Torque compensation signal Cmp output from compensation signal generation unit 13, as described above, is added by adder 14 to first torque instruction signal Tq1 output from control and computation unit 12. Adder 14 outputs a result of the addition as second torque instruction signal Tq2.

Second torque instruction signal Tq2 is supplied to drive unit 15. Drive unit 15 generates and outputs drive signal Dv used to power-drive the winding wires of motor 60 based on second torque instruction signal Tq2. That is, drive unit 15 is equipped with an inverter, and uses the inverter to generate drive signal Dv in accordance with second torque instruction signal Tq2 being supplied. When drive signal Dv is applied to the winding wires of motor 60, motor 60 is power-driven, and accordingly the rotor in motor 60 rotates.

Next, a configuration of compensation signal generation unit 13 will now be described in detailed with reference to FIG. 1.

As illustrated in FIG. 1, compensation signal generation unit 13 includes compensation value generation unit 32, switching timing generation unit 33, signal switching unit 35, compensation signal direct current cut-off unit 34, and delay circuits 39a, 39b.

Compensation value generation unit 32 first generates first torque compensation value Val1 corresponding to one rotation direction of motor 60 and second torque compensation value Val2 corresponding to another rotation direction opposite to the one rotation direction. First torque compensation value Val1 and second torque compensation value Val2 are normally opposite to each other in rotation direction. One of the values represents a positive value, while the other of the values represents a negative value.

On the other hand, switching timing generation unit 33 generates switching timing signal Psw indicative of a timing of switching. The signal is utilized to generate torque compensation signal Cmp. The timing of switching corresponds to a timing when the rotation direction of motor 60 inverts. For generating switching timing signal Psw described above, switching timing generation unit 33 includes inversion detection unit 332 and timing generation unit 333. Inversion detection unit 332 is configured to detect that a polarity of a signal acquired by differentiating positional instruction signal Pr inverts. Timing generation unit 333 is configured to output, as switching timing signal Psw, a signal indicative of the polarity of the signal acquired by differentiating positional instruction signal Pr. Specifically, when positional instruction signal Pr is increasing in magnitude, a polarity of a signal acquired through differentiation is positive. In this case, switching timing signal Psw is at a high (H) level. When positional instruction signal Pr is decreasing in magnitude, a polarity of a signal acquired through differentiation is negative. In this case, switching timing signal Psw is at a low (L) level. A timing when switching timing signal Psw changes between the H level and the L level corresponds to a timing when a rotation direction of motor 60 inverts. Specifically, since each process requires a processing period, switching timing signal Psw is compensated to a proper timing by delay circuit 39a and delay circuit 39b. An acquired signal is then supplied to the units. Delay circuit 39a and delay circuit 39b are provided to allow timings of first torque instruction signal Tq1 to be provided via control and computation unit 12 and torque compensation signal Cmp to be provided via switching timing generation unit 33 and signal switching unit 35 to match each other, for example. Below describes that switching timing signal Psw that has undergone delay compensation with delay circuit 39a, as described above, is supplied to signal switching unit 35, while switching timing signal Psw that has undergone delay compensation with delay circuit 39a and delay circuit 39b, as described above, is supplied to compensation signal direct current cut-off unit 34.

First torque compensation value Val1 and second torque compensation value Val2 are supplied to switch 51 of signal switching unit 35. Switch 51 selects and outputs either first torque compensation value Val1 or second torque compensation value Val2 in accordance with a level of switching timing signal Psw. The torque compensation values that have been output are combined so that a combined output represents a torque compensation value corresponding to a rotation direction. Combined torque compensation signal Sg acquired through combining as described above is then output from signal switching unit 35.

Next, compensation signal direct current cut-off unit 34 is supplied with, in addition to combined torque compensation signal Sg, switching timing signal Psw from switching timing generation unit 33. Compensation signal direct current cut-off unit 34 is configured to output torque compensation signal Cmp generated by cutting off a direct current component in combined torque compensation signal Sg so that the direct current component asymptotically approaches zero, in accordance with a timing of a change in level of switching timing signal Psw. That is, compensation signal direct current cut-off unit 34 outputs torque compensation signal Cmp, as described above, in accordance with a rotation direction inversion operation of motor 60. Torque compensation signal Cmp is added, by adder 14, to first torque instruction signal Tq1 output from control and computation unit 12. An acquired signal is then supplied to drive unit 15 as second torque instruction signal Tq2.

Figure 3:
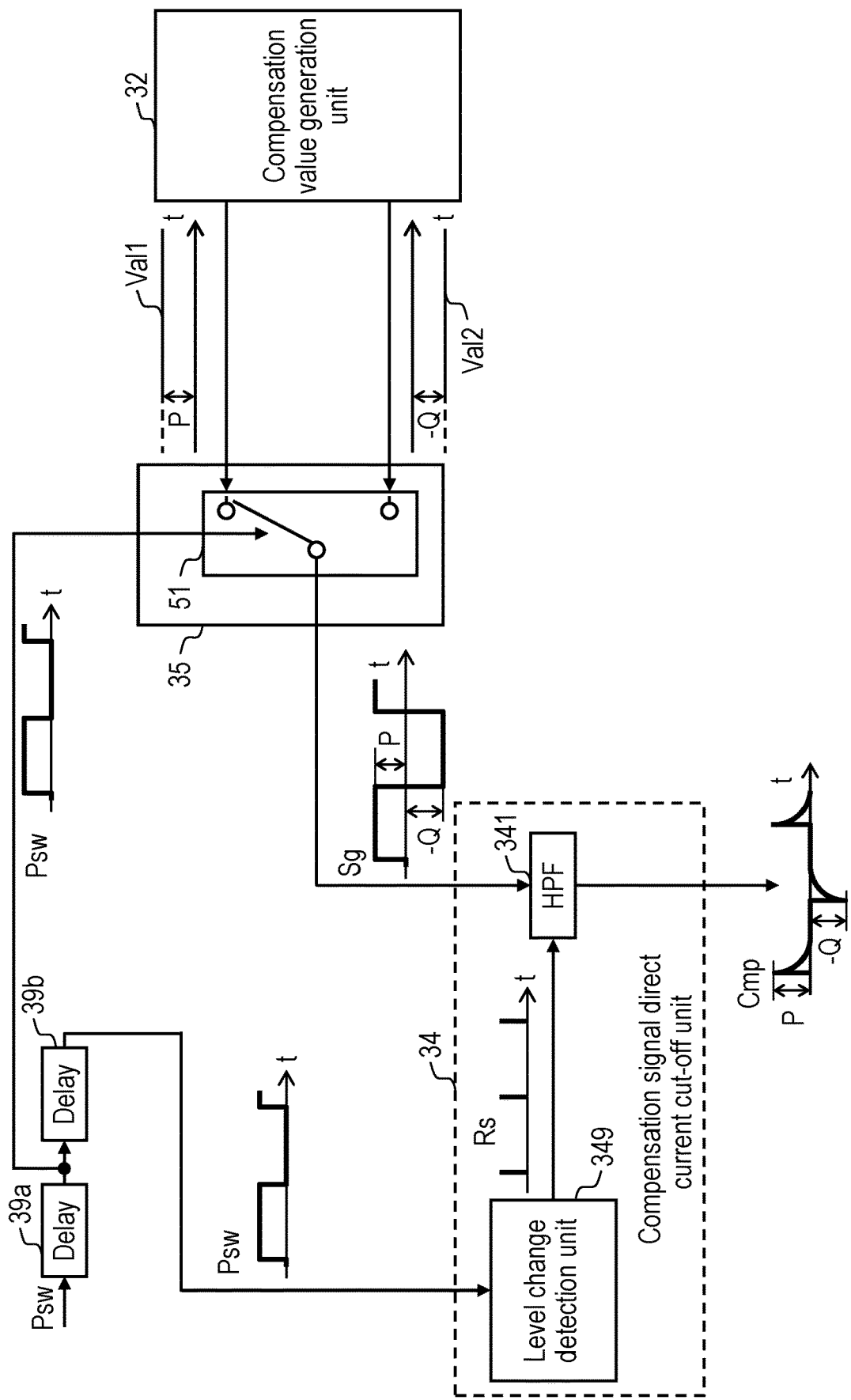
FIG. 3 is a detailed block diagram of principal portions including a compensation signal direct current cut-off unit in a compensation signal generation unit of the motor control device according to the first exemplary embodiment of the present invention.

FIG. 3 is a detailed block diagram of principal portions including compensation signal direct current cut-off unit 34 in compensation signal generation unit 13 of motor control device 10 according to the exemplary embodiment. FIG. 3 illustrates an example when compensation value generation unit 32 generates and outputs first torque compensation value Val1 with a positive value of "P" and second torque compensation value Val2 with a negative value of "−Q".

First torque compensation value Val1 and second torque compensation value Val2 are supplied to signal switching unit 35 of switch 51. Switch 51 is further supplied with switching timing signal Psw that has been delayed. Switch 51 selects either first torque compensation value Val1 or second torque compensation value Val2 in accordance with a level of switching timing signal Psw. Signal switching unit 35 therefore outputs combined torque compensation signal Sg acquired by combining the torque compensation values, as illustrated in FIG. 3. That is, switch 51 outputs, as switch 51 switches, combined torque compensation signal Sg showing a rectangular wave representing a level of either the positive value of "P" or the negative value of "−Q" in accordance with a rotation direction, as illustrated in FIG. 3. FIG. 3 illustrates an example of selecting and outputting first torque compensation value Val1 when switching timing signal Psw that has been delayed is at the H level, and second torque compensation value Val2 when switching timing signal Psw that has been delayed is at the L level.

Combined torque compensation signal Sg is supplied to compensation signal direct current cut-off unit 34. Compensation signal direct current cut-off unit 34 includes high-pass filter (HPF) 341 and level change detection unit 349, as illustrated in FIG. 3.

Level change detection unit 349 is supplied with switching timing signal Psw that has been delayed. Level change detection unit 349 is configured to perform differential computing, for example, to detect a timing when a level of switching timing signal Psw changes, and to supply, to HPF 341, as reset signal Rs, a signal indicative of the timing when the level changes.

HPF 341 is supplied with combined torque compensation signal Sg. HPF 341 is a high-pass filter, and is configured to function so as to cut off a direct current component in an entered signal, and to output an acquired signal. With this configuration, HPF 341 outputs torque compensation signal Cmp from which a direct current component has been cut off so that the direct current component in combined torque compensation signal Sg asymptotically approaches zero.

When a digital filter is used to configure HPF 341, for example, a direct current component accumulates inside the digital filter based on an operation principle of the digital filter. In combined torque compensation signal Sg, at timings when switching takes place between first torque compensation value Val1 and second torque compensation value Val2, a value of a direct current component that has further accumulated is added to the torque compensation value that has been switched. To prevent negative effects of a direct current component being accumulated, it is required that HPF 341 be reset simultaneously to a timing of switching. To achieve this, in the exemplary embodiment, level change detection unit 349 sends reset signal Rs to HPF 341 at a timing when switching timing signal Psw that has been delayed has changed to reset HPF 341.

Figure 4:
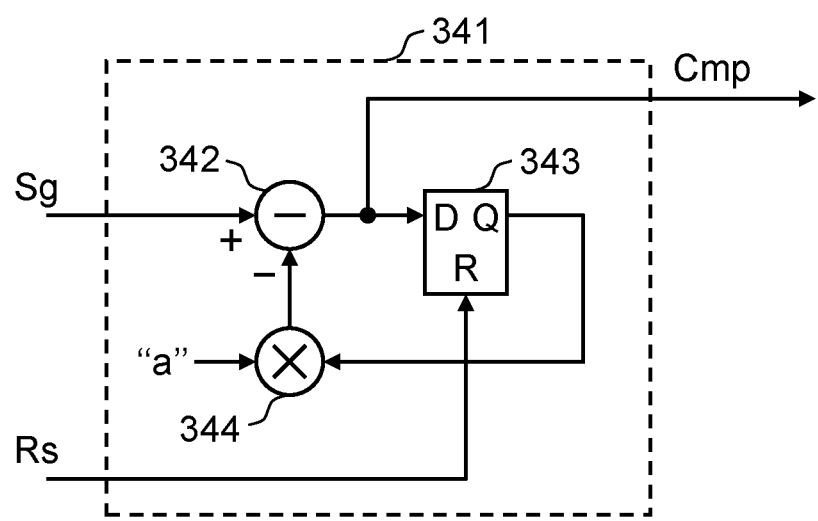
FIG. 4 is a block diagram illustrating details of a configuration example of a high-pass filter (HPF) of the compensation signal direct current cut-off unit according to the first exemplary embodiment of the present invention.

FIG. 4 is a block diagram illustrating details of a configuration example of HPF 341 of compensation signal direct current cut-off unit 34 of motor control device 10 according to the exemplary embodiment. HPF 341 illustrated in FIG. 4 is an example of a high-pass filter formed into a most basic configuration of an infinite impulse response (IIR) type digital filter with a transfer function represented as $f(z)=1/(1+az^{-1})$. In FIG. 4, a difference value between an input value of an input signal and a value output from multiplier 344 is computed by subtractor 342. The difference value is taken by and accumulated in D flip-flop 343. D flip-flop 343 is a delay element in filter principle, and, specifically, is a memory configured to store and accumulate values. An accumulated value is multiplied by multiplier 344 by a power of "a (a is greater than 0, and equal to or below 1)", and an acquired value is output. The process, as described above, is cyclically repeated, and output signals acquired by cutting off a direct current component from input signals are output for achieving a function as a high-pass filter.

HPF 341 illustrated in FIG. 4 further utilizes D flip-flop 343 with a reset function. By resetting D flip-flop 343, an accumulated value can be reset to zero.

Upon combined torque compensation signal Sg is supplied, HPF 341 illustrated in FIG. 4 operates as follows. Here assumes that combined torque compensation signal Sg has changed from the positive value of "P" to the negative value of "−Q" at a switching timing in accordance with switching timing signal Psw. In this case, D flip-flop 343 is accumulated with a value of "P/a" corresponding to the positive value of "P" that has been entered so far.

If D flip-flop 343 is not reset, the value of "P" is output from multiplier 344 when the negative value of "−Q" is supplied to an input. Subtractor 342 therefore outputs a value of "−(Q+P)". That is, at a switching timing, first torque compensation value Val1 and second torque compensation value Val2 are mixed.

On the other hand, in the exemplary embodiment, when a signal has changed to the negative value of "−Q", D flip-flop 343 is reset. D flip-flop 343 outputs zero when the negative value of "−Q" is supplied to the input. Multiplier 344 also outputs zero. Subtractor 342 therefore outputs the entered value, i.e., "−Q". In the exemplary embodiment, compensation signal direct current cut-off unit 34 configured as described above is provided. Therefore, without allowing first torque compensation value Val1 and second torque compensation value Val2 to mix up, a separate, appropriate compensation value can be allowed to act.

That is, as illustrated in FIG. 3, torque compensation signal Cmp output from compensation signal direct current cut-off unit 34 reaches, at a timing when switching timing signal Psw changes, a positive peak value equivalent to first torque compensation value Val1 or a negative peak value equivalent to second torque compensation value Val2. A timing when switching timing signal Psw changes corresponds to a timing when a rotation direction of motor 60 inverts. At a timing of inversion, a signal for torque compensation, which has a predetermined period width having a torque compensation value as a peak value, as described above, is added. A significant change in friction torque, which occurs at a timing of inversion, is compensated with torque compensation signal Cmp, preventing greater quadrant projection from occurring.

As described above, in the exemplary embodiment, compensation signal generation unit 13 performs switching to a torque compensation value having a predetermined value at a switching timing based on a timing when a rotation direction of motor 60 inverts, and, after switching, generates torque compensation signal Cmp allowing a direct current component to asymptotically approach zero. In the exemplary embodiment, torque compensation signal Cmp is added to first torque instruction signal Tq1 output from control and computation unit 12 so as to compensate a significant change in friction torque, which occurs when a rotation direction of motor 60 inverts. A torque instruction is thus compensated.

The configuration example in which compensation signal generation unit 13 outputs torque compensation signal Cmp acquired by cutting off a direct current component in combined torque compensation signal Sg has been described. However, such a configuration may be applicable that compensation signal generation unit 13 further includes compensation signal smoothing unit 53, as described below.

Figure 5:
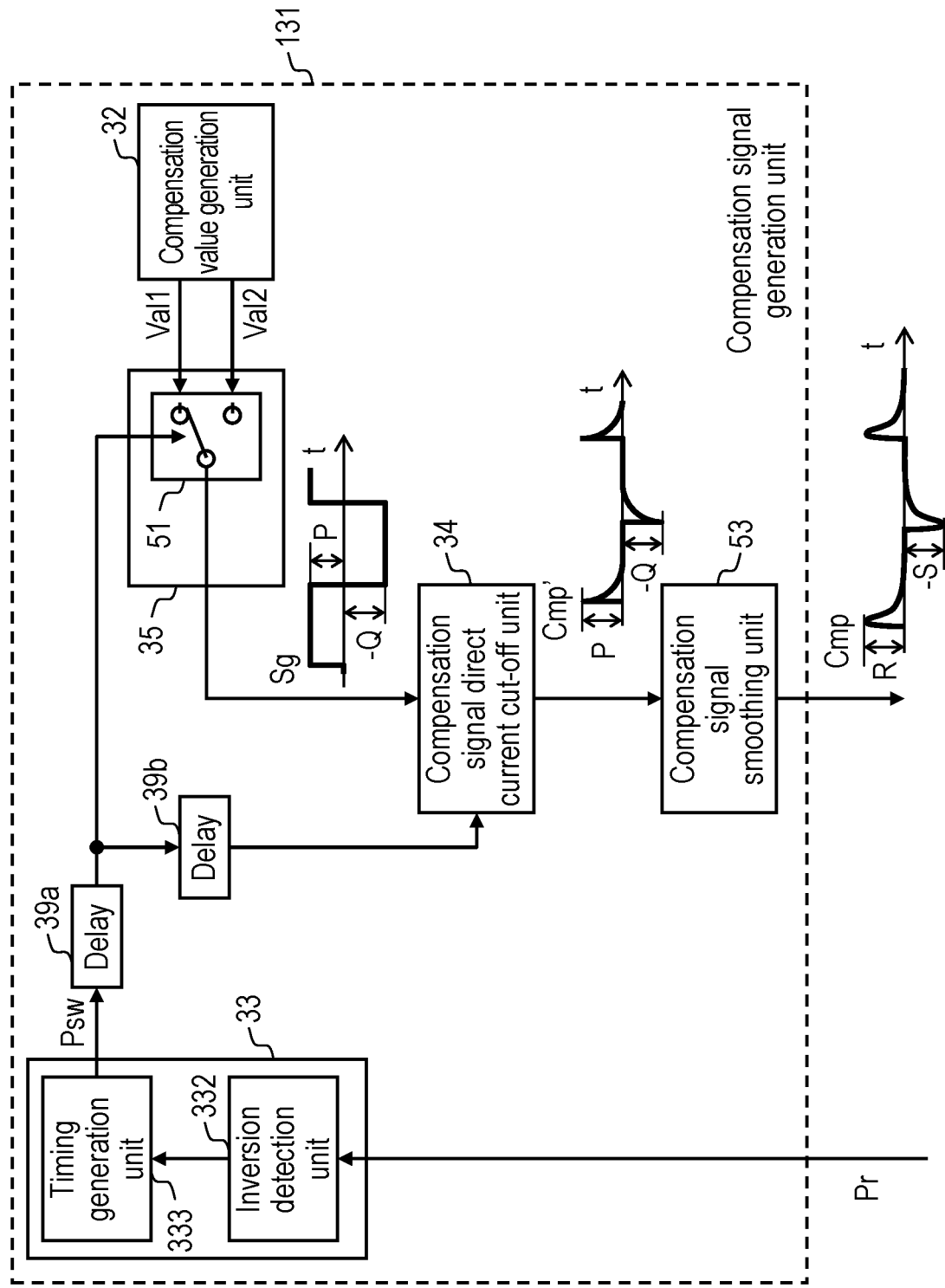
FIG. 5 is a block diagram illustrating another configuration example of the compensation signal generation unit of the motor control device according to the first exemplary embodiment of the present invention.

FIG. 5 is a block diagram illustrating compensation signal generation unit 131 representing another configuration example of a compensation signal generation unit for motor control device 10 according to the exemplary embodiment. As illustrated in FIG. 5, signal Cmp' output from compensation signal direct current cut-off unit 34 is supplied to compensation signal smoothing unit 53. Signal Cmp' in FIG. 5 represents torque compensation signal Cmp in FIG. 3. Compensation signal smoothing unit 53 is a low-pass filter, for example, configured to attenuate a high-frequency component in signal Cmp' to perform smoothing on signal Cmp' so that a gentle change is achieved immediately after switching of a torque compensation value. Such a configuration may be adopted that a signal that has undergone smoothing with compensation signal smoothing unit 53, as described above, is supplied to adder 14 as torque compensation signal Cmp. By providing compensation signal smoothing unit 53 as illustrated in FIG. 5, torque compensation signal Cmp can be a signal almost achieving friction torque that changes gently. In compensation of friction torque, further adaptation to the friction torque can thus be achieved.

Next, operation of motor control device 10 according to the exemplary embodiment will now be described with reference to an example when axis X and axis Y are driven by using two pairs of motor 60 and motor control device 10 configured as described above, and when positional instruction signal Pr is provided so that circular trajectories are rendered.

Figure 6:
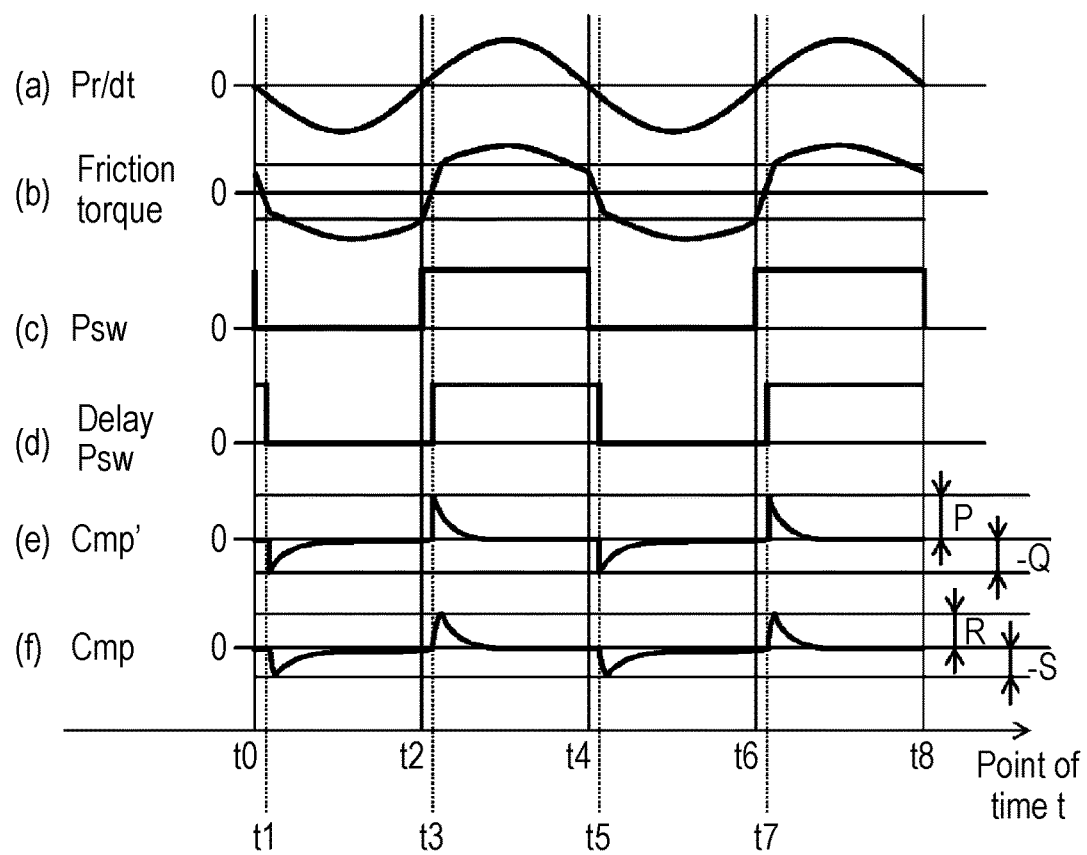
FIG. 6 is a waveform chart illustrating signal waveforms of units of the motor control device according to the first exemplary embodiment of the present invention.
Figure 7:
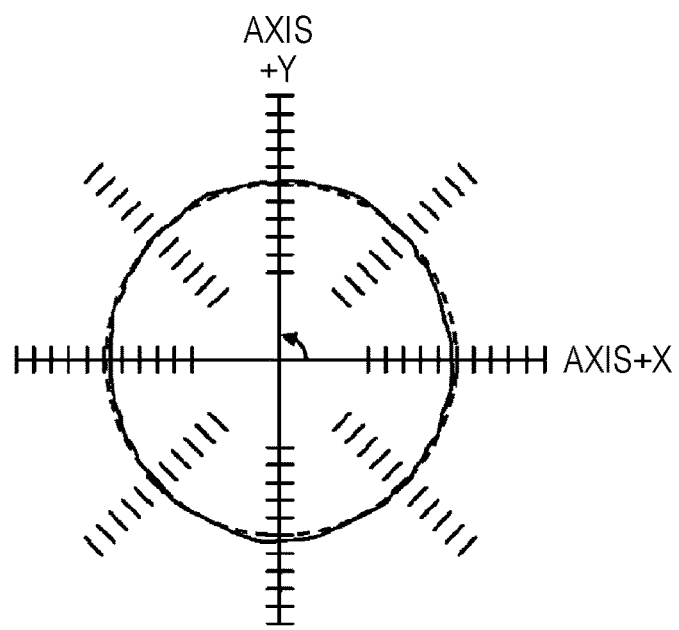
FIG. 7 is a view illustrating a result of measurement on magnitude of trajectory deviation when the motor control device according to the first exemplary embodiment of the present invention caused two axes, i.e., axis X and axis Y, to each render a circular trajectory.

FIG. 6 is a waveform chart illustrating signal waveforms of units of motor control device 10 according to the exemplary embodiment, i.e., signal waveforms of the units of motor control device 10 on one of the axes. In FIG. 6, the waveform chart is separated into (a) to (f), and waveforms of signal Pr/dt, friction torque, switching timing signal Psw, switching timing signal Psw that is delayed, signal Cmp', and signal Cmp are illustrated in a descending order. FIG. 7 is a view illustrating a result of measurement on magnitude of trajectory deviation when the configuration according to the exemplary embodiment caused the two axes, i.e., axis X and axis Y, to each render a circular trajectory.

In FIG. 6, signal Pr/dt represents a signal acquired by differentiating positional instruction signal Pr entered into motor control device 10, and corresponds to a speed instruction. As a polarity of signal Pr/dt inverts at points of time t0, t2, t4, and t6, a rotation direction of motor 60 inverts. Accordingly, as illustrated in FIG. 6, friction torque in the machine also significantly changes in a direction toward which a polarity inverts.

Switching timing signal Psw output from switching timing generation unit 33 represents, as illustrated in FIG. 6, a signal that inverts at points of time t0, t2, t4, and t6. Switching timing signal Psw is delayed by a predetermined time period by delay circuits 39a, 39b, and represents a signal with a polarity that inverts at points of time t1, t3, t5, and t7, as illustrated in FIG. 6. In accordance with switching timing signal Psw that is delayed, switching takes place between first torque compensation value Val1 and second torque compensation value Val2 in signal switching unit 35. First torque compensation value Val1 represents a value corresponding to a point of time when a polarity of speed instruction signal Pr/dt switches from negative to positive, and is selected from periods ranging from points of time t0 to t1, from points of time t3 to t5, and from points of time t7 to t8. On the other hand, second torque compensation value Val2 represents a value corresponding to a point of time when the polarity of speed instruction signal Pr/dt switches from positive to negative, and is selected from periods ranging from points of time t1 to t3 and from points of time t5 to t7.

In this case, first torque compensation value Val1 output from compensation value generation unit 32 has a value of "+P", while second torque compensation value Val2 has a value of "−Q". In compensation signal direct current cut-off unit 34, as switching timing signal Psw that is delayed switches, HPF 341 acts, and a direct current component in combined torque compensation signal Sg is cut off. Signal Cmp' output from compensation signal direct current cut-off unit 34 renders such a waveform that shows the value of "+P" or "−Q" immediately after switched at points of time t1, t3, t5, and t7, as illustrated in FIG. 6, and then a direct current component asymptotically approaches zero.

In the configuration illustrated in FIG. 5, signal Cmp' enters into compensation signal smoothing unit 53 including the low-pass filter, while torque compensation signal Cmp output from compensation signal smoothing unit 53 represents a signal rendering a waveform that is smoothed greater than a waveform of signal Cmp', as illustrated in FIG. 6.

As described above, torque compensation signal Cmp generated in motor control device 10 represents a signal conforming in timing to a change in friction torque when a rotation direction inverts, as illustrated in FIG. 6. As described above, torque compensation signal Cmp generated in compensation signal generation unit 13 represents a signal almost achieving friction torque that changes gently in accordance with a delay in response on a rotational position of motor 60, as well as represents a further appropriate signal used to compensate friction torque.

Further, as illustrated in FIG. 6, a change in friction torque when a polarity of speed instruction signal Pr/dt changes from negative to positive and a change in friction torque when the polarity of speed instruction signal Pr/dt changes from positive to negative differ in magnitude. It is required that an appropriate torque compensation signal that differs in magnitude be provided. In the exemplary embodiment, first torque compensation value Val1 and second torque compensation value Val2 are separately generated to meet this purpose. In the exemplary embodiment, in particular, compensation signal direct current cut-off unit 34 is configured such that HPF 341 is reset at switching timing to reduce direct current components accumulated in HPF 341 to zero. With torque compensation signal Cmp configured as described above, a compensation signal having amplitude toward a positive side of "P" corresponds to a change in friction torque in one direction, as described above, while a compensation signal having amplitude toward a negative side of "−Q" corresponds to a change in friction torque in another direction, as described above. On the other hand, if compensation signal direct current cut-off unit 34 according to the exemplary embodiment is not provided, amplitude acting as a torque compensation signal is either "(P+Q)" or "−(P+Q)", both of which are equivalent in magnitude.

As described above, the exemplary embodiment is configured to include compensation signal generation unit 13 including compensation signal direct current cut-off unit 34. With the above described configuration, as illustrated in FIG. 6, amplitude at positive side peaks of torque compensation signal Cmp' at points of time t3, t7 takes one of values of "P" and "−Q", while amplitude at negative side peaks of torque compensation signal Cmp' at points of time t1, t5 takes the other of the values of "P" and "−Q". The signal acts with separately different amplitude on respective positive and negative sides. Torque compensation signal Cmp becomes a further appropriate signal used to compensate friction torque. As a result, as illustrated in FIG. 7, quadrant projection is suppressed.

Such a configuration may be adopted that, on the other hand, when a torque compensation signal may have identical amplitude on both of the positive and negative sides, the reset operation for HPF 341 in compensation signal direct current cut-off unit 34 is omitted. That is, combined torque compensation signal Sg may be supplied to HPF 341 for generating a torque compensation signal without resetting HPF 341. Even with the above described configuration, an effect of suppressing quadrant projection can be acquired at a rather lower level than a level achieved in the configuration illustrated in FIG. 3.

As described above, the motor control device according to the first exemplary embodiment of the present invention acts so that a torque compensation signal appropriately compensates a change in friction torque that significantly changes at a timing when a quadrant switches. With this motor control device, quadrant projection is further suppressed as a result, compared with a conventional motor control device. A motor control device capable of further suppressing quadrant projection can thus be achieved.

Second Exemplary Embodiment

Figure 8:
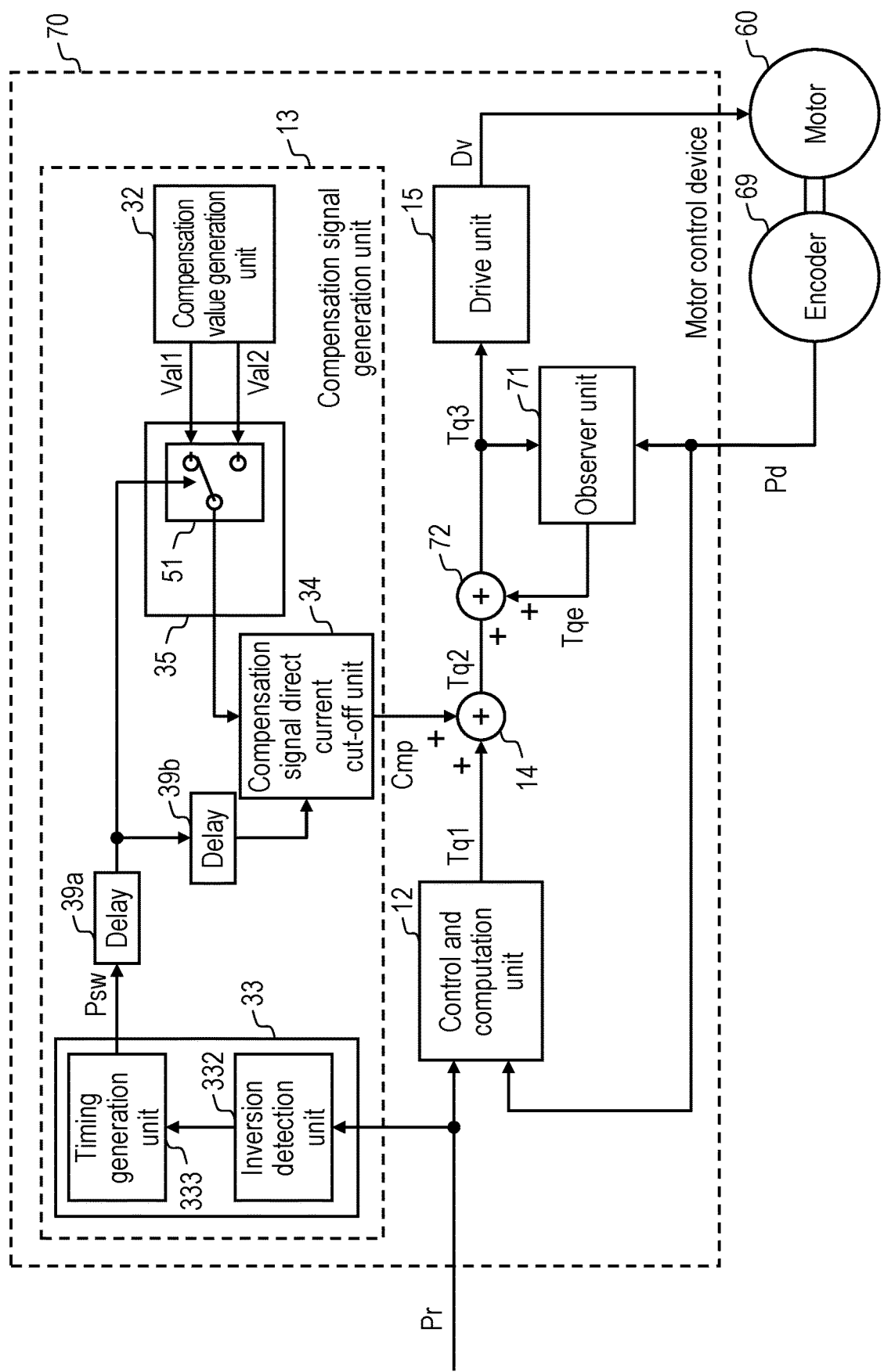
FIG. 8 is a block diagram of a motor control system including a motor control device according to a second exemplary embodiment of the present invention.

FIG. 8 is a block diagram of a motor control system including motor control device 70 according to a second exemplary embodiment of the present invention.

When compared with motor control device 10 in FIG. 1, motor control device 70 according to the exemplary embodiment further includes observer unit 71 and second adder 72. Compensation signal generation unit 13 may be compensation signal generation unit 131 including compensation signal smoothing unit 53, as illustrated in FIG. 5. Detailed descriptions of similar or identical components to the components of the first exemplary embodiment are omitted. Only differences will now be described.

As illustrated in FIG. 8, observer unit 71 is configured to accept third torque instruction signal Tq3 entered into drive unit 15 and position detection signal Pd output from encoder 69. Observer unit 71 is configured to estimate load torque to motor 60 based on the two signals, and to output a load torque estimation value. Second adder 72 is configured to add load torque estimation signal Tqe indicative of the load torque estimation value to second torque instruction signal Tq2. The exemplary embodiment is configured to include observer unit 71, as described above, to reduce negative effects due to when load torque to motor 60 fluctuates, which causes a rotational position to deviate. A detailed configuration of observer unit 71 described above, and its operation will now be described.

Figure 9:
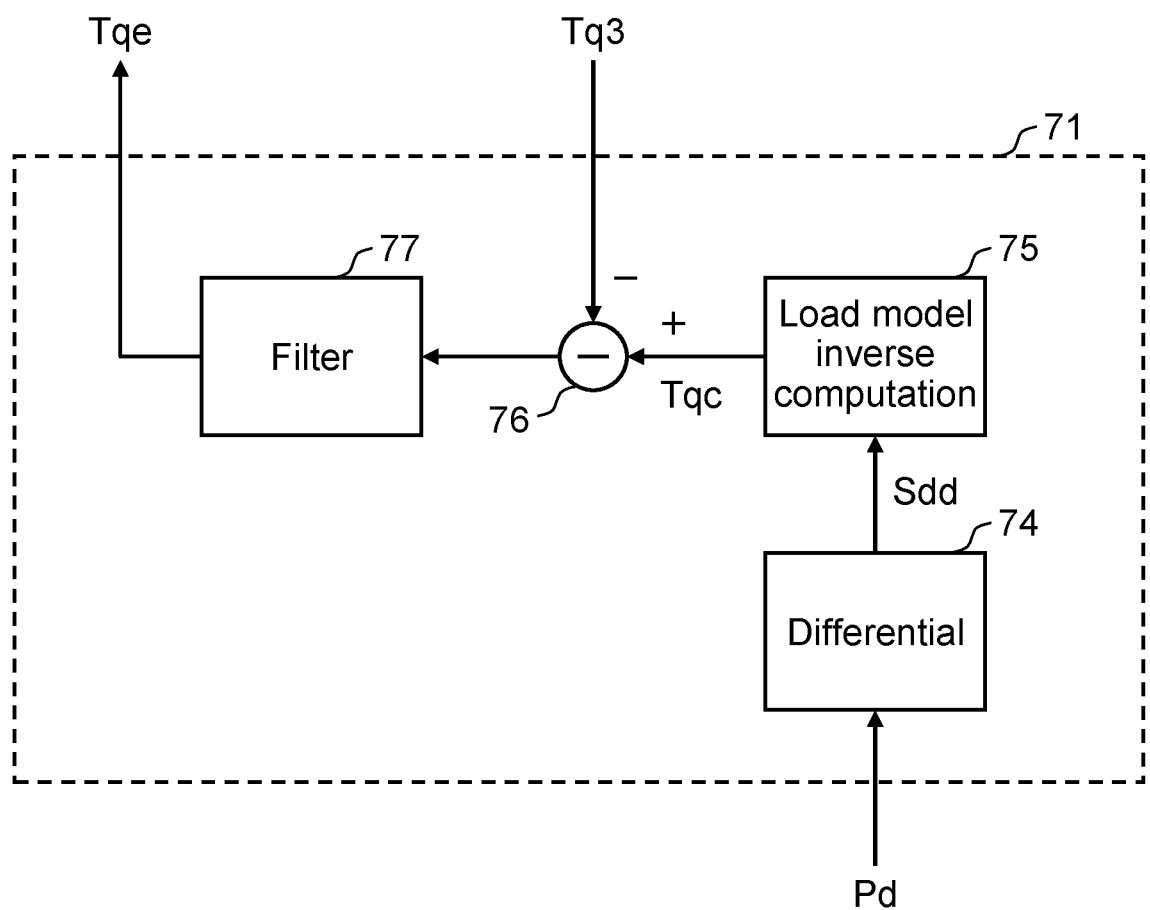
FIG. 9 is a block diagram of an observer unit of the motor control device according to the second exemplary embodiment of the present invention.

FIG. 9 is a block diagram illustrating a detailed configuration of observer unit 71 of motor control device 70 according to the exemplary embodiment. In FIG. 9, when position detection signal Pd enters, position detection signal Pd undergoes time differentiation by differential processing unit 74, and is converted into rotational speed signal Sdd indicative of a rotational speed. Rotational speed signal Sdd then enters into load model inverse computation processing unit 75. A torque value including drive torque and load torque applied to motor 60 is calculated and output as combined torque signal Tqc. By calculating, with difference computation unit 76, a difference between combined torque signal Tqc output from load model inverse computation processing unit 75 and third torque instruction signal Tq3 indicative of the drive torque applied to motor 60, an estimation value of the load torque applied to motor 60 can be calculated.

In the exemplary embodiment, a signal indicative of the estimation value of the load torque is further caused to pass through filter 77 having a characteristic of a low-pass filter to allow observer unit 71 to output the signal as load torque estimation signal Tqe. As described above, by outputting an estimation value of load torque via filter 77, unnecessary noise components included in the estimation value of the load torque are removed. Further, stability of a negative feedback loop to be formed when load torque estimation signal Tqe is added to second torque instruction signal Tq2 in second adder 72, simultaneously to the removal of noise, can be secured.

An example when axis X and axis Y are driven by using two pairs of motor 60 and motor control device 70 configured as described above, and when positional instruction signal Pr is provided so that circular trajectories are rendered will now be described. Operation of motor control device 70 according to the exemplary embodiment will now be described with reference to comparison with the operation of motor control device 10 according to the first exemplary embodiment.

Figure 10:
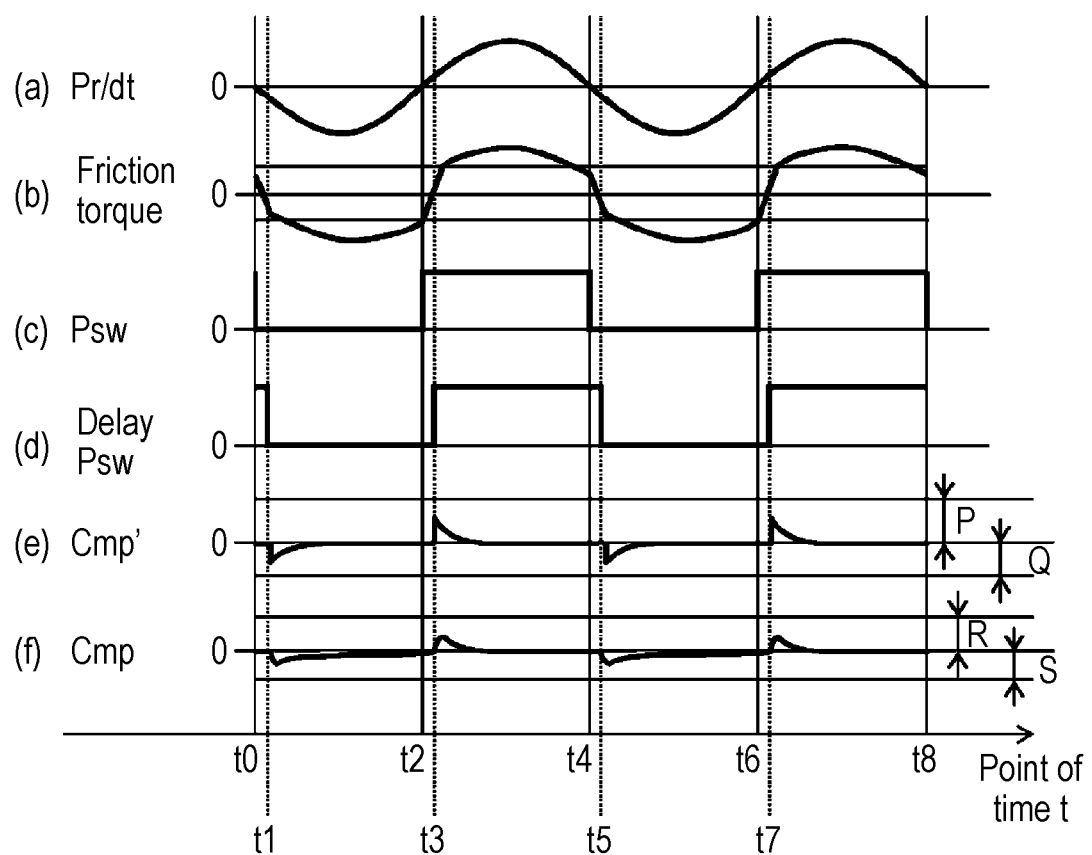
FIG. 10 is a waveform chart illustrating signal waveforms of units of the motor control device according to the second exemplary embodiment of the present invention.

FIG. 10 is a waveform chart illustrating signal waveforms of units of motor control device 70 according to the exemplary embodiment, i.e., signal wave forms of the units of motor control device 70 on one of the axes. Signals in FIG. 10 illustrate identical signals illustrated in (a) to (f) separated in FIG. 6.

As illustrated in FIG. 8, in motor control device 70 including observer unit 71, load torque estimation signal Tqe output from observer unit 71 acts so as to compensate fluctuation of load torque applied to motor 60. That is, most of load torque applied to motor 60, which is illustrated as the friction torque in FIG. 10, is compensated by load torque estimation signal Tqe output from observer unit 71 as a result. Compared with motor control device 10 according to the first exemplary embodiment, first torque compensation value Val1 and second torque compensation value Val2 are both reduced to smaller values of approximately one tenth. As illustrated in FIG. 10, even when torque compensation signal Cmp is reduced in amplitude, fluctuation of load torque applied to motor 60 can be fully compensated in the exemplary embodiment by adding load torque estimation signal Tqe to second torque instruction signal Tq2.

Figure 11:
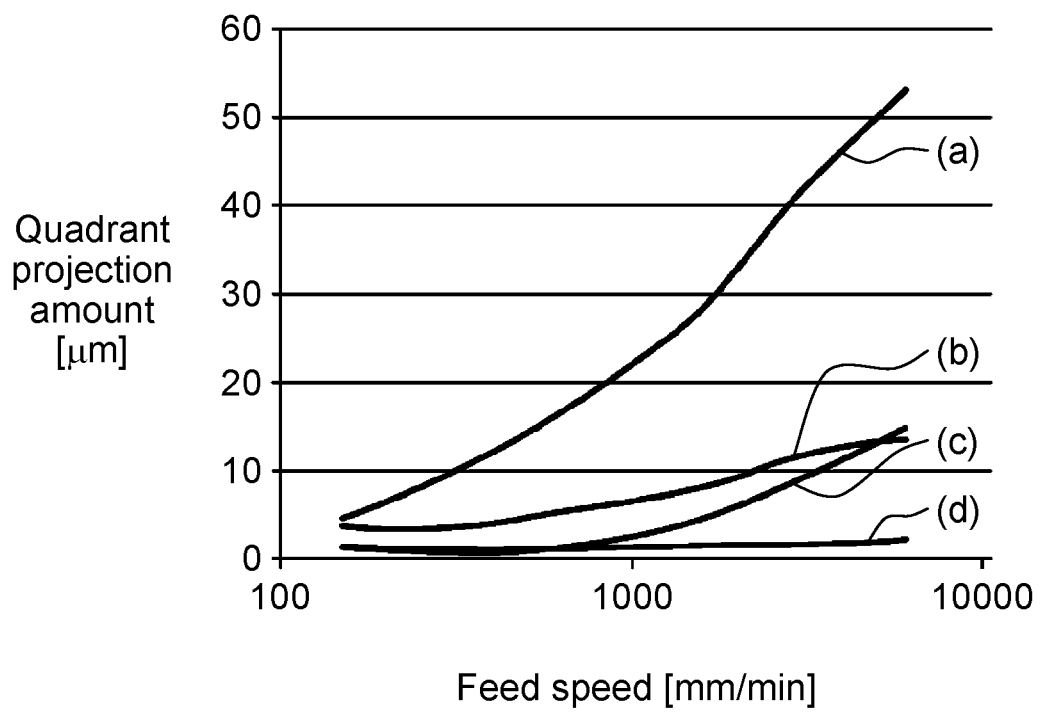
FIG. 11 is a view illustrating, as a graph, changes in magnitude of quadrant projection in configurations according to the first and second exemplary embodiments of the present invention.

FIG. 11 is a view illustrating, as a graph, changes in magnitude of quadrant projection in the configurations according to the first and second exemplary embodiments. In FIG. 11, a horizontal axis shows results of measurement on feed speed in axis X and axis Y, while vertical axis shows results of measurement on magnitude in quadrant projection. In FIG. 11, (a) to (d) show results of measurement in the cases described below. First, in FIG. 11, (b) shows a result when, in motor control device 10 illustrated in FIG. 1, first torque compensation value Val1 and second torque compensation value Val2 were adjusted to appropriate values. In FIG. 11, (a) shows a result when, in motor control device 10, first torque compensation value Val1 and second torque compensation value Val2 were set to zero. It can be seen that appropriately setting torque compensation values significantly improves quadrant projection.

On the other hand, in FIG. 11, (d) shows a result when, in motor control device 70 illustrated in FIG. 8, first torque compensation value Val1 and second torque compensation value Val2 were adjusted to appropriate values. In FIG. 11, (d) shows further improvements from the result of (b) in FIG. 11, in which quadrant projection was suppressed in wider feed speed ranges in axis X and axis Y. In FIG. 11, (c) shows a result when, in motor control device 70, first torque compensation value Val1 and second torque compensation value Val2 were set to zero. According to the result, it can be seen that, even when observer unit 71 acted fully, a response speed was limited, and quadrant projection tended to worsen over a higher feed speed range. However, as illustrated by (d) in FIG. 11, both of appropriately setting torque compensation values and using observer unit 71 mutually and effectively acted to suppress quadrant projection. As a result, quadrant projection can be fully suppressed.

Further, as described above, in motor control device 70, a torque compensation value can be set to a smaller value than a set value in motor control device 10, reducing a degree of negative effects due to varied machine friction and changes through aging, relative to the set value. As a result, the negative effects would be less likely to act.

As described above, in the motor control device according to the second exemplary embodiment of the present invention, the observer unit acts to effectively compensate values of a torque compensation signal and a load torque estimation signal. As a result, quadrant projection can be further suppressed in a wider feed speed range. A torque compensation signal can also be set to a relatively smaller value. As a result, negative effects due to varied machine friction and changes through aging would be less likely to act. A servo motor control device capable of stably suppressing quadrant projection further can thus be achieved.

In the exemplary embodiment, the configuration example in which second adder 72 adds load torque estimation signal Tqe to second torque instruction signal Tq2 has been described. The exemplary embodiment can obviously be modified as described below. That is, the configuration may be modified such that adder 14 adds and outputs load torque estimation signal Tqe sent from the observer unit, in addition to torque compensation signal Cmp, as well as an order of adder 14 configured to add torque compensation signal Cmp and second adder 72 configured to add load torque estimation signal Tqe may be switched.

Third Exemplary Embodiment

Figure 12:
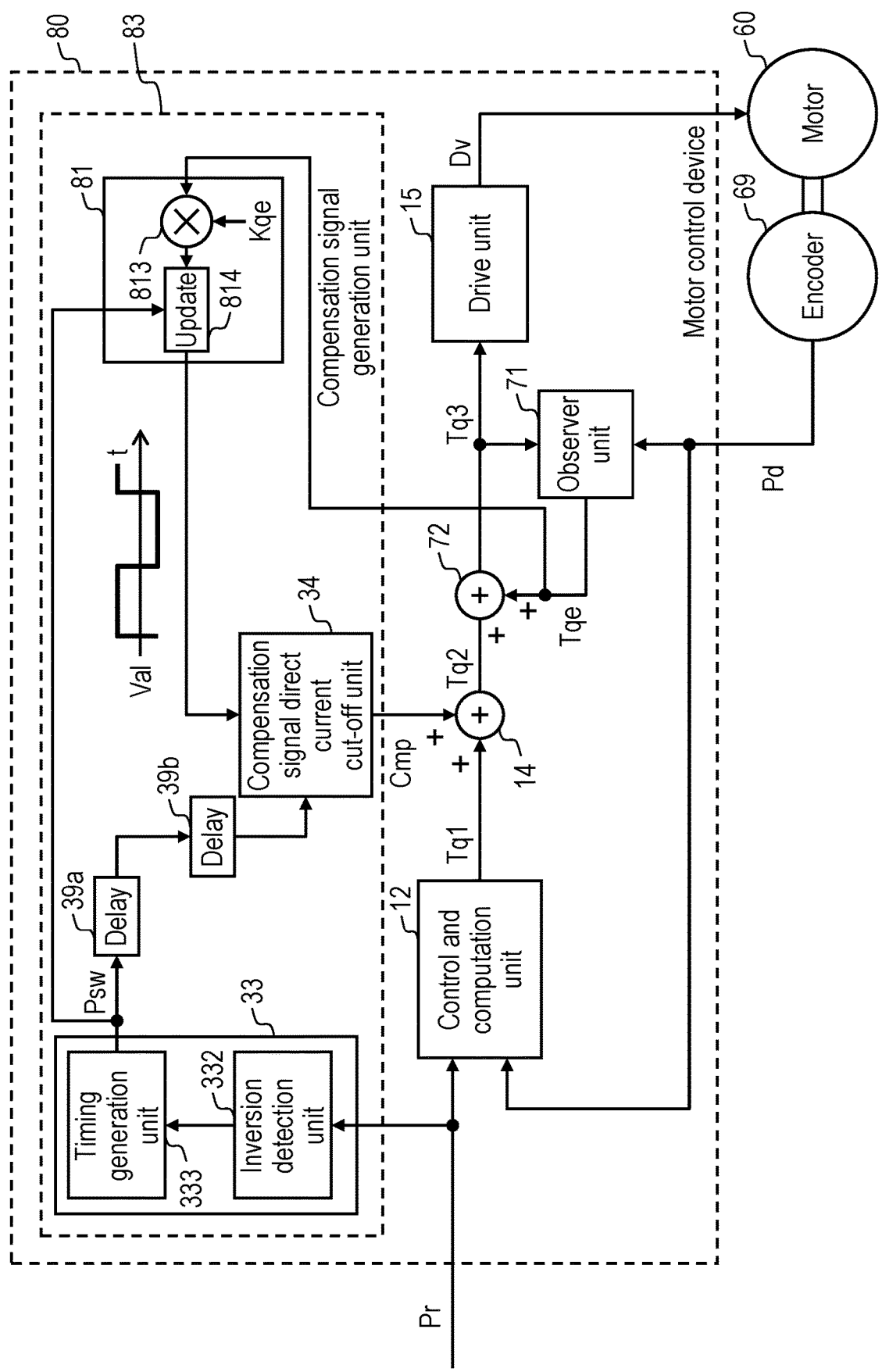
FIG. 12 is a block diagram of a motor control system including a motor control device according to a third exemplary embodiment of the present invention.

FIG. 12 is a block diagram of a motor control system including motor control device 80 according to a third exemplary embodiment of the present invention.

When compared with motor control device 70 in FIG. 8, motor control device 80 according to the exemplary embodiment includes compensation signal generation unit 83 including compensation value calculation unit 81. Compensation signal generation unit 83 may be configured to include compensation signal smoothing unit 53, as illustrated in FIG. 5. Detailed descriptions of similar or identical components to the components of the second exemplary embodiment are omitted. Only differences will now be described.

As illustrated in FIG. 12, compensation value calculation unit 81 is configured to accept load torque estimation signal Tqe output from observer unit 71 and switching timing signal Psw output from switching timing generation unit 33. Compensation value calculation unit 81 is further configured to update and output torque compensation value Val at a timing when switching timing signal Psw changes. Torque compensation value Val enters into compensation signal direct current cut-off unit 34. Load torque estimation signal Tqe output from observer unit 71 represents a magnitude of machine friction, and can be utilized as torque compensation value Val. Specifically, a process of setting, as torque compensation value Val, a value acquired by multiplying predetermined coefficient Kqe with a load torque estimation value indicated by load torque estimation signal Tqe is performed.

However, when a servo motor is applied to a vertical axis that is subject to gravity, load torque due to machine friction and load torque due to gravity apply in an overlapping manner to motor 60. When motor 60 is applied to a vertical axis, it is required that load torque due to gravity be subtracted from a load torque estimation value to be output from observer unit 71 to acquire a magnitude of machine friction only.

Figure 13:
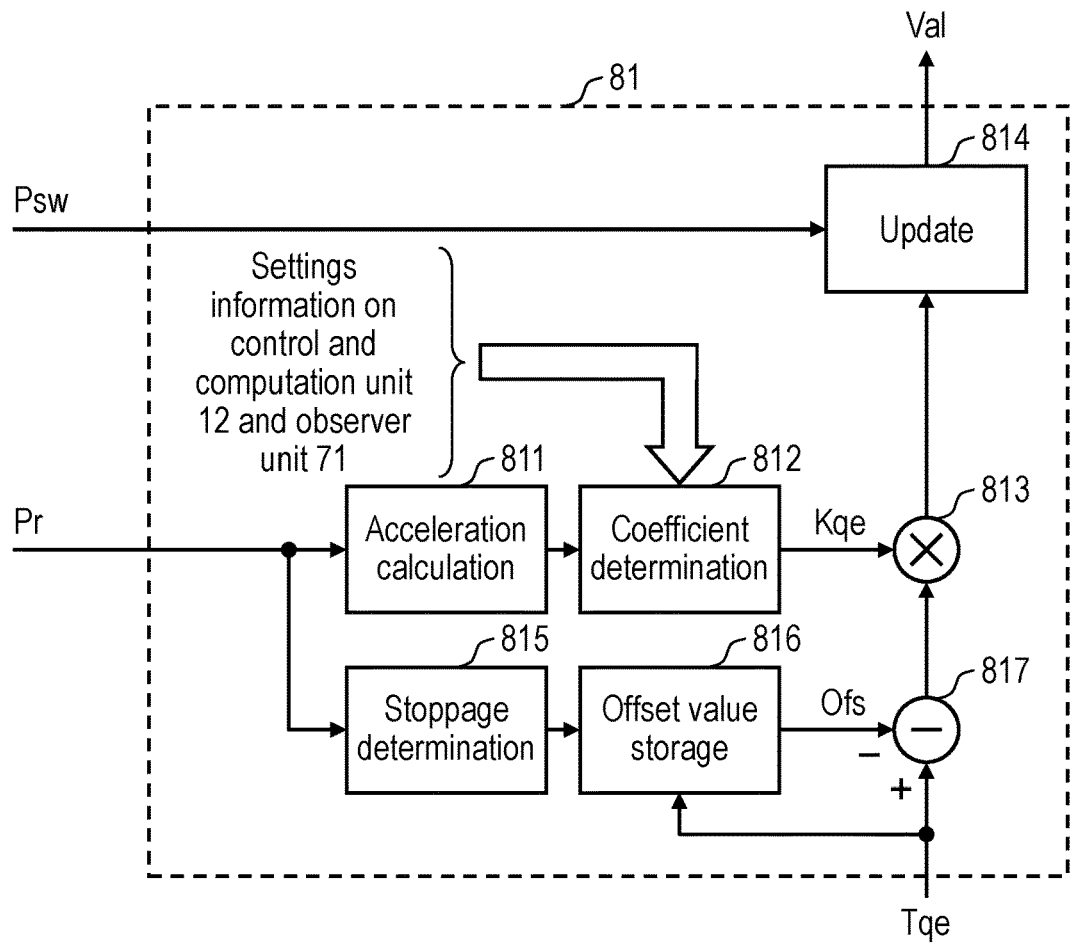
FIG. 13 is a block diagram of a compensation value calculation unit of the motor control device according to the third exemplary embodiment of the present invention.
Figure 14:
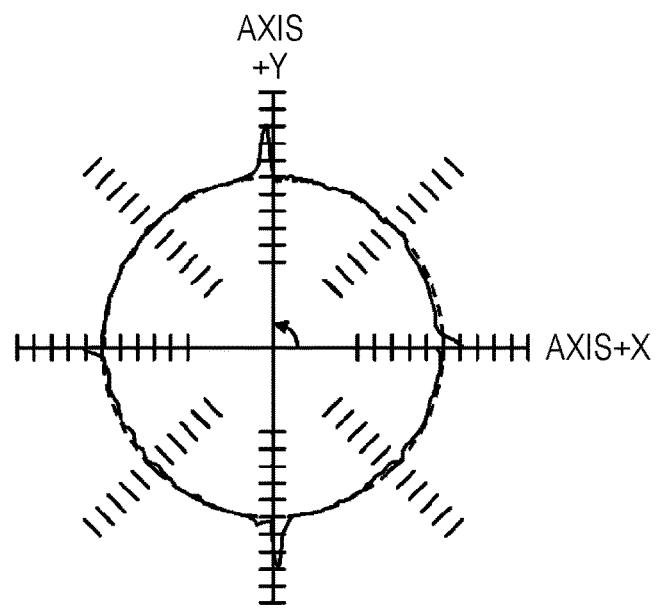
FIG. 14 is a view illustrating a result of measurement on magnitude of trajectory deviation on two axes, i.e., axis X and axis Y, in a conventional motor control device.
Figure 15:
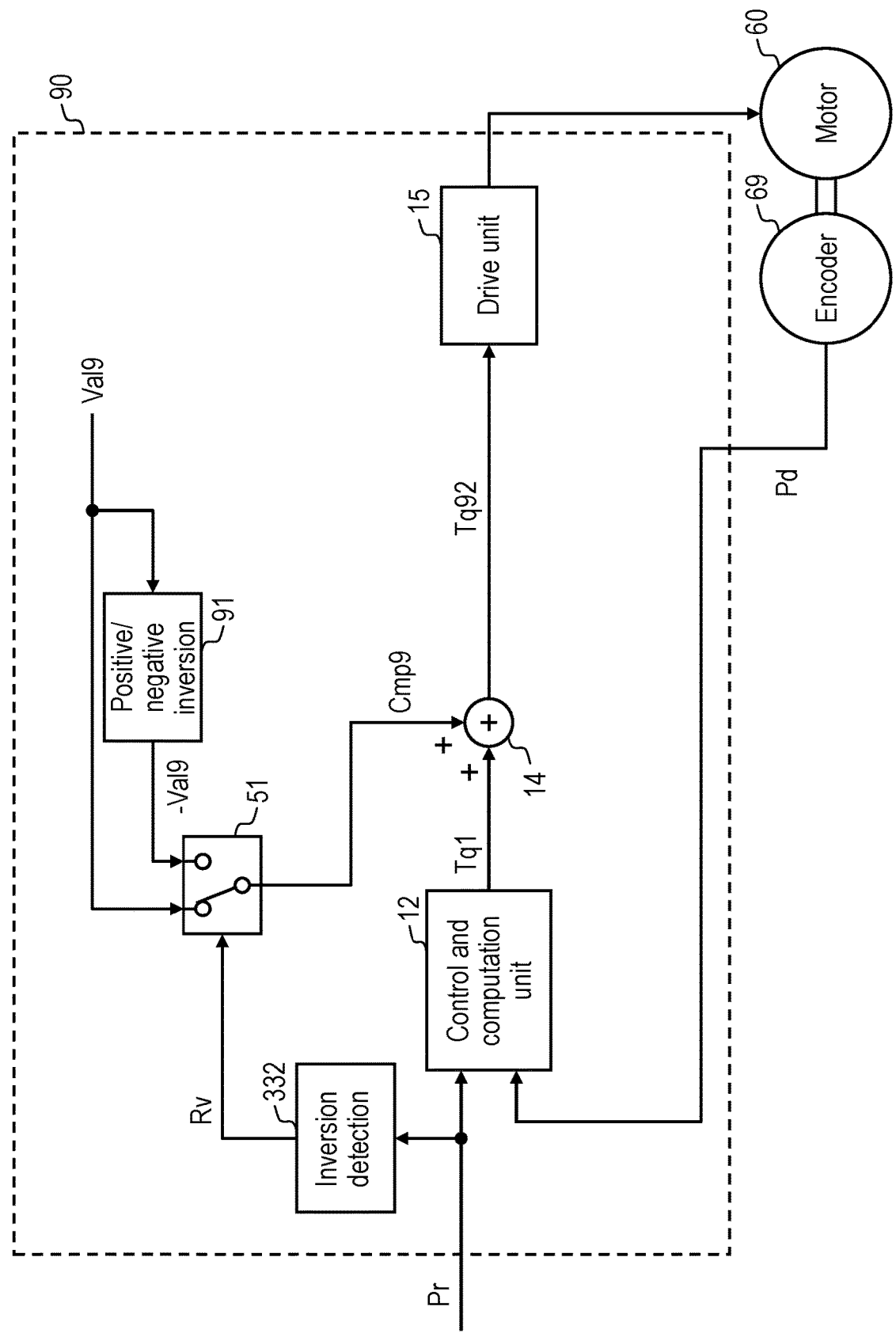
FIG. 15 is a block diagram of a motor control system including the conventional motor control device.
Figure 16:
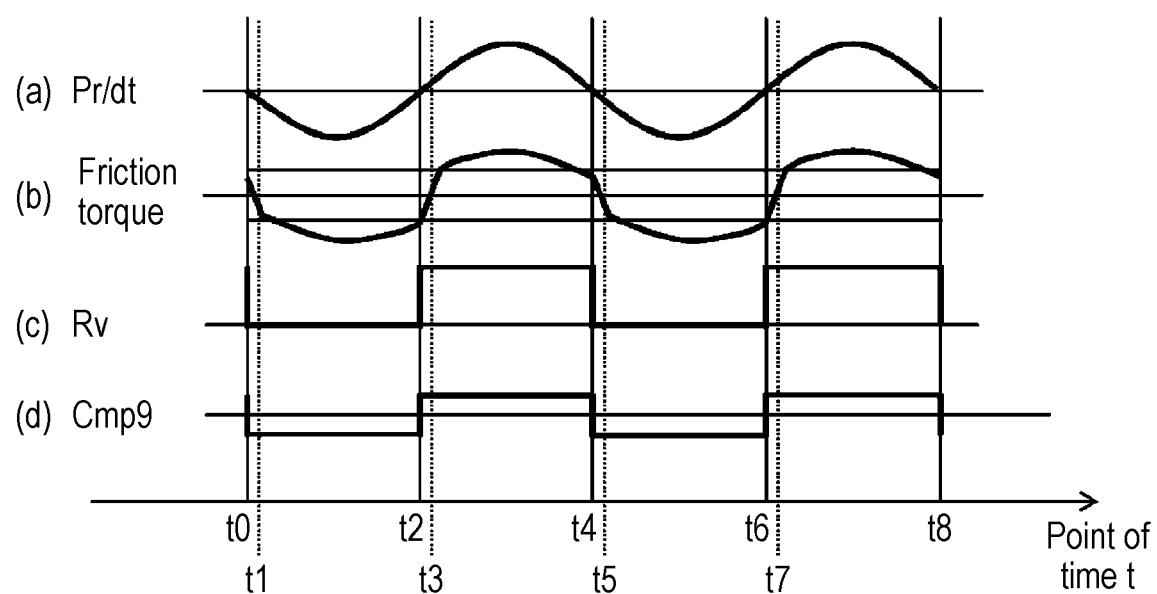
FIG. 16 is a waveform chart illustrating signal waveforms of units of the conventional motor control device.

FIG. 13 is a block diagram illustrating a detailed configuration of compensation value calculation unit 81 when negative effects to load torque due to gravity, as described above, is taken into account. In FIG. 13, stoppage determination unit 815 is configured to determine whether positional instruction signal Pr does not change for a certain period, in other words, to determine whether a stopped state is attained. When stoppage determination unit 815 determines the stopped state, stoppage determination unit 815 sends an instruction to offset storage unit 816 so as to store a value of load torque estimation signal Tqe being entered. With this configuration, offset storage unit 816 holds, as offset value Ofs, the value of load torque estimation signal Tqe when the stopped state is attained. Difference computation unit 817 subtracts offset value Ofs stored in offset storage unit 816 from the value of load torque estimation signal Tqe being entered, and outputs an acquired value to coefficient multiplier 813.

Acceleration calculation unit 811 further differentiates a speed instruction acquired by differentiating positional instruction signal Pr, calculates acceleration at a timing when the speed instruction changes from negative to positive or positive to negative, and sends acquired acceleration to coefficient determination unit 812. A reason of sending an acceleration value to coefficient determination unit 812 is that predetermined coefficient Kqe, described above, needs to be changed in accordance with a feed speed. Coefficient determination unit 812 determines predetermined coefficient Kqe based on the acceleration value and settings information, such as constants in control and computation unit 12 and observer unit 71, and sends predetermined coefficient Kqe to coefficient multiplier 813. Coefficient multiplier 813 multiplies predetermined coefficient Kqe with an output value of difference computation unit 817, and sends an acquired value to update unit 814. Update unit 814 updates the value entered from coefficient multiplier 813 at a timing when switching timing signal Psw changes, and outputs an updated value as torque compensation value Val.

Compensation value calculation unit 81 configured as described above sets torque compensation value Val based on a value of load torque estimation signal Tqe output from observer unit 71 at a timing when a speed instruction changes from negative to positive or from positive to negative. As long as a proper coefficient is determined in coefficient determination unit 812, a value that is enough and proper as torque compensation value Val is automatically output as a result. That is, separately setting, through adjustments, first torque compensation value Val1 and second torque compensation value Val2, as can be seen in motor control device 70 according to the second exemplary embodiment of the present invention, is not necessary. However, a torque compensation value is automatically set with respect to varied machine friction and changes through aging. As a result, negative effects would be less likely to act. Further, stoppage is detected, load torque due to gravity is subtracted, and a torque compensation value is set. As a result, negative effects due to gravity would be less likely to act.

As illustrated in the friction torque in FIG. 10, load torque of motor 60 varies in magnitude between a value at point of time t2 and a value at point of time t4. However, compensation value calculation unit 81 updates and outputs torque compensation value Val at a timing when switching timing signal Psw illustrated in FIG. 10 changes. A signal exactly equivalent to torque compensation signal Cmp illustrated in FIG. 10 can be output without making any adjustments. Through mutual effects with the process of adding, to torque instruction signal Tq2, a value of load torque estimation signal Tqe output from observer unit 71, quadrant projection can be fully suppressed.

As described above, in the motor control device according to the third exemplary embodiment of the present invention, in addition to a torque compensation signal, a value of a load torque estimation signal sent from the observer unit effectively acts for compensation, further suppressing quadrant projection in a wider feed speed range as a result. A value of a torque compensation signal is a relatively smaller value, and is automatically set. As a result, negative effects due to varied machine friction and changes through aging would be further less likely to act. Further, even when a servo motor is applied to a vertical axis, a value of a torque compensation signal is automatically and appropriately set. A highly stable motor control device capable of further suppressing quadrant projection can thus be achieved.

The configuration examples in which the motor control devices according to the first to third exemplary embodiments include functional blocks, such as digital circuits, have been described. However, for example, a process configured based on a program performing steps may be applied. That is, for example, functions of control and computation unit 12, compensation signal generation units 13, 131, and 83, and observer unit 71, for example, may be stored in a memory, for example, as a program configured to execute a control and process method. With a configuration in which a microcomputer executes the program, the exemplary embodiments can also be achieved.

INDUSTRIAL APPLICABILITY

As described above, the motor control devices according to the present invention are capable of appropriately compensating a change in load torque when a rotation direction inverts. The motor control devices according to the present invention can be utilized in controlling an industry-use, FA servo motor, and, in particular, can be applied for use in a processing machine for which accuracy in trajectory is required, for example.

The invention claimed is:

1. A motor control device configured to control a rotation operation of a motor so that a rotational position of the motor follows a positional instruction entered externally, the motor control device comprising:
   a control and computation unit configured to perform computation processing based on the rotational position of the motor, the rotational position being detected, and the positional instruction, and to generate a first torque instruction signal to be used to drive the motor;
   a compensation signal generation unit configured to generate a torque compensation signal to be used to compensate the first torque instruction signal;
   an adder configured to add the torque compensation signal to the first torque instruction signal, and to output a result of the addition as a second torque instruction signal; and
   a drive unit configured to be supplied with the second torque instruction signal, and, based on the second torque instruction signal, to generate a drive signal to be used to power-drive winding wires of the motor,
   wherein the compensation signal generation unit is further configured to generate the torque compensation signal that combines a first torque compensation value having a first predetermined value and a second torque compensation value having a second predetermined value by switching between the first torque compensation value and the second torque compensation value at a switching timing based on a timing when a rotation direction of the motor inverts, the first torque compensation value corresponding to one rotation direction of the motor and the second torque compensation value corresponding to another rotation direction opposite to the one rotation direction.

2. The motor control device according to claim 1, wherein the torque compensation signal generated by the compensation signal generation unit is a signal that asymptotically approaches zero after switched between the first torque compensation value and the second torque compensation value.

3. The motor control device according to claim 2, wherein the torque compensation signal generated by the compensation signal generation unit further gently changes immediately after switched between the first torque compensation value and the second torque compensation value.

4. The motor control device according to claim 1, wherein the compensation signal generation unit includes:
   a compensation value generation unit configured to generate the first torque compensation value and the second torque compensation value;
   a switching timing generation unit configured to generate the switching timing;
   a signal switching unit configured to perform switching between the first torque compensation value and the second torque compensation value based on the switching timing, to perform value combining, and to generate and output a combined torque compensation signal; and
   a compensation signal direct current cut-off unit configured to cut off a direct current component to be outputted as the torque compensation signal, the direct current component being included in the combined torque compensation signal.

5. The motor control device according to claim 4, wherein the compensation signal direct current cut-off unit includes a high-pass filter capable of resetting an internally accumulated direct current component, and wherein the high-pass filter is configured to be reset based on the switching timing, and to output the torque compensation signal from which the direct current component included in the combined torque compensation signal is cut off.

6. The motor control device according to claim 4, wherein the compensation signal generation unit further includes a compensation signal smoothing unit configured to perform smoothing the torque compensation signal to be outputted so that the torque compensation signal gradually changes after the switching takes place between the first torque compensation value and the second torque compensation value, and outputs, as the torque compensation signal, a signal smoothed by the compensation signal smoothing unit.

7. The motor control device according to claim 1, further comprising
an observer unit configured to detect load torque applied to the motor from the second torque instruction signal supplied to the drive unit and a rotational speed of the motor, and to output a load torque estimation signal corresponding to the load torque,
wherein the adder adds the load torque estimation signal to the first torque instruction signal, in addition to the torque compensation signal, and outputs an acquired signal.

8. The motor control device according to claim 7, further comprising:
a compensation value calculation unit configured to generate the torque compensation signal by calculating and updating a value for a torque compensation on the switching timing based on the load torque estimation signal when a rotation direction of the motor inverts.

9. The motor control device according to claim 8, wherein the compensation value calculation unit compensates the torque compensation value by a predetermined offset value, and sets a result of the compensation as the value for the torque compensation value.

10. The motor control device according to claim 9, wherein the compensation value calculation unit stores, as the predetermined offset value, the load torque estimation signal when the motor stops, compensates the torque compensation value by the predetermined offset value, and sets an acquired value.

11. The motor control device according to claim 5, wherein the compensation signal generation unit further includes a compensation signal smoothing unit configured to perform smoothing the torque compensation signal to be outputted so that the torque compensation signal gradually changes after the switching takes place between the first torque compensation value and the second torque compensation value, and outputs, as the torque compensation signal, a signal smoothed by the compensation signal smoothing unit.

12. The motor control device according to claim 2, further comprising:
an observer unit configured to detect load torque applied to the motor from the second torque instruction signal supplied to the drive unit and a rotational speed of the motor, and to output a load torque estimation signal corresponding to the load torque,
wherein the adder adds the load torque estimation signal to the first torque instruction signal, in addition to the torque compensation signal, and outputs an acquired signal.

13. The motor control device according to claim 3, further comprising:
an observer unit configured to detect load torque applied to the motor from the second torque instruction signal supplied to the drive unit and a rotational speed of the motor, and to output a load torque estimation signal corresponding to the load torque,
wherein the adder adds the load torque estimation signal to the first torque instruction signal, in addition to the torque compensation signal, and outputs an acquired signal.

14. The motor control device according to claim 4, further comprising:
an observer unit configured to detect load torque applied to the motor from the second torque instruction signal supplied to the drive unit and a rotational speed of the motor, and to output a load torque estimation signal corresponding to the load torque,
wherein the adder adds the load torque estimation signal to the first torque instruction signal, in addition to the torque compensation signal, and outputs an acquired signal.

15. The motor control device according to claim 5, further comprising:
an observer unit configured to detect load torque applied to the motor from the second torque instruction signal supplied to the drive unit and a rotational speed of the motor, and to output a load torque estimation signal corresponding to the load torque,
wherein the adder adds the load torque estimation signal to the first torque instruction signal, in addition to the torque compensation signal, and outputs an acquired signal.

* * * * *